United States Patent
Zheng et al.

(10) Patent No.: US 9,215,574 B2
(45) Date of Patent: Dec. 15, 2015

(54) METHOD AND APPARATUS FOR SCHEDULING SHORT MESSAGES IN CODE DIVISION MULTIPLE ACCESS SINGLE-MODE DUAL-STANDBY TERMINAL

(75) Inventors: Xianju Zheng, Shenzhen (CN); Zitao Xue, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 409 days.

(21) Appl. No.: 13/581,469

(22) PCT Filed: Dec. 14, 2010

(86) PCT No.: PCT/CN2010/079743
§ 371 (c)(1),
(2), (4) Date: Aug. 27, 2012

(87) PCT Pub. No.: WO2012/006855
PCT Pub. Date: Jan. 19, 2012

(65) Prior Publication Data
US 2012/0320830 A1    Dec. 20, 2012

(30) Foreign Application Priority Data
Jul. 15, 2010    (CN) .......................... 2010 1 0230922

(51) Int. Cl.
*H04W 4/00*    (2009.01)
*H04W 4/14*    (2009.01)
(52) U.S. Cl.
CPC ...................................... *H04W 4/14* (2013.01)
(58) Field of Classification Search
USPC ........................................................ 370/328
See application file for complete search history.

(56) References Cited

U.S. PATENT DOCUMENTS 8,494,578 B2 *    7/2013    Seo .............................. 455/552.1
8,897,277 B2 *    11/2014    Kalhan ......................... 370/338
(Continued)

FOREIGN PATENT DOCUMENTS

CN    1960550    *    5/2007
CN    1960550 A        5/2007
(Continued)

OTHER PUBLICATIONS

International Search Report in international application No. PCT/CN2010/079743, mailed on Apr. 21, 2011.
(Continued)

*Primary Examiner* — Faruk Hamza
*Assistant Examiner* — Shah R Zaman
(74) *Attorney, Agent, or Firm* — Oppedahl Patent Law Firm

(57) ABSTRACT

A method for dispatching short messages in a Code Division Multiplex Access (CDMA) single-mode dual-standby terminal is disclosed in the present disclosure. The method comprises the following steps: the CDMA single-mode dual-standby terminal processes the short message service of an activated user and defers a processing on the received voice calling service and/or data service required by the activated user when processing the short message service, and then defers a processing on the received short message service, voice calling service and data service required by an inactivated user. An apparatus for dispatching short messages in a Code Division Multiplex Access (CDMA) single-mode dual-standby terminal is also disclosed. The method and apparatus of the present disclosure realize a reasonable short message service management and dispatching for a CDMA single-mode dual-standby terminal.

11 Claims, 3 Drawing Sheets

(56) References Cited

U.S. PATENT DOCUMENTS

| | | |
|---|---|---|
| 2003/0195003 A1* | 10/2003 | Cao et al. .................... 455/438 |
| 2007/0021051 A1* | 1/2007 | Choi et al. .................. 455/3.01 |
| 2009/0131054 A1* | 5/2009 | Zhang ......................... 455/436 |
| 2009/0156257 A1* | 6/2009 | Shi .............................. 455/558 |
| 2010/0009716 A1* | 1/2010 | Lee et al. .................... 455/558 |
| 2010/0167781 A1 | 7/2010 | Seo |
| 2011/0021142 A1* | 1/2011 | Desai et al. ................ 455/41.2 |

FOREIGN PATENT DOCUMENTS

| | | | |
|---|---|---|---|
| CN | 101137148 A | | 3/2008 |
| CN | 101217739 | * | 7/2008 |
| CN | 101247597 A | | 8/2008 |
| CN | 101252738 A | | 8/2008 |
| CN | 101895845 A | | 11/2010 |

OTHER PUBLICATIONS

English Translation of the Written Opinion of the International Search Authority in international application No. PCT/CN2010/079743, mailed on Apr. 21, 2011.

* cited by examiner

METHOD AND APPARATUS FOR SCHEDULING SHORT MESSAGES IN CODE DIVISION MULTIPLE ACCESS SINGLE-MODE DUAL-STANDBY TERMINAL

TECHNICAL FIELD

The present disclosure relates to a scheduling technology used in communications, and more particularly to a method and apparatus for scheduling short messages in a Code Division Multiple Access (CDMA) single-mode dual-standby terminal.

BACKGROUND

A CDMA single-mode dual-standby terminal refers to a communication terminal which realizes the synchronous use of two cards based on a single base band and a single radio frequency module and therefore expands communication capacity. That is, a terminal user has two number accesses for initiating a short message service and therefore experiences an improved communication service.

However, in actual use, the short message service of a CDMA single-mode dual-standby terminal has certain randomness, which is mainly embodied in the following two aspects: certain randomness in sending a short message from a network side to a terminal, and certain randomness in submission of a message initiated by a terminal user.

Moreover, in actual use, apart from temporal discontinuity in sending and receiving processes, there is an increase in data quantity of messages sent or received by a CDMA single-mode dual-standby terminal each time due to a long-content short message service and a short message group sending service. Therefore, a CDMA single-mode dual-standby terminal having only one radio frequency mechanism is required to be capable of managing concurrent competing dual-standby short message services reasonably when scheduling messages. Furthermore, a CDMA single-mode dual-standby terminal is also required to take account of influence of other supported communication services (e.g., voice service, data service and the like) on a short message service.

No technical solution has been proposed to reasonable short message scheduling of a CDMA single-mode dual-standby terminal.

SUMMARY

In views of the problem above, it is a main object of the present disclosure to provide a method and apparatus for scheduling short messages in a CDMA single-mode dual-standby terminal, which realize a reasonable short message service managing and scheduling for a CDMA single-mode dual-standby terminal.

In order to achieve the purpose above, the technical scheme of the present disclosure is realized as follows:

A method for scheduling short messages in a CDMA single-mode dual-standby terminal is provided, which includes the following steps:

when a short message service needs to be performed, the CDMA single-mode dual-standby terminal first processes the short message service of an activated user; defers a processing on the received voice service and/or data service required by the activated user when processing the short message service; and then defers a processing on the received short message service, voice service and data service required by an inactivated user.

In the scheme above, before the short message service needs to be performed, the method may further include the following steps:

the dual-standby terminal determines a standby user using the short message service according to the received network paging information or a user-originated short message request; and the dual-standby terminal activates the standby user using a short message service to enter a short message service processing state;

in the case that the short message service is to receive a short message, then the process that the dual-standby terminal defers the processing on the received voice service and/or data service required by the activated user when processing the short message service is specifically as follows: the dual-standby terminal receives short messages for the activated user and defers the processing on the received voice service and data service of the activated user.

In the scheme above, in the case that the short message service is to send a short message, then the process that the dual-standby terminal defers the processing on the received voice service and/or data service required by the activated user when processing the short message service is specifically as follows:

the dual-standby terminal determines whether or not a single link establishment is allowed, if a single link establishment is allowed, establishes a backward service channel link, sends one or more short messages for the activated user, and defers a processing on the received voice service and data service of the activated user during the sending process; or if a single link establishment is not allowed, establishes a backward service channel link, sends one short message, and defers a processing on the received voice service and data service of the activated user during the sending process; and after the one short message is sent, the dual-standby terminal disconnects the backward service channel link, determines whether or not the activated user still has short messages to be sent, if so, re-establishes a backward service channel link to send a next one short message until all rest short messages are sent.

In the scheme above, the process of receiving a short message may be as follows:

directly receiving the short message if a paging channel is used to receive the short message; or in the case where a forward service channel is used to receive the short message, the dual-standby terminal sends a forward service channel link establishment request to a network side; after receiving the request, the network side establishes a forward service channel link with the dual-standby terminal and returns a message 'LINK ESTABLISHED' to the dual-standby terminal; and the dual-standby terminal receives the short message after receiving the returned message.

In the scheme above, the deferring the processing may be as follows:

during the reception of the short message for the activated user, the dual-standby terminal stores the received voice service and data service of the activated user, and/or the short message service, voice service and data service of the inactivated user; and after determining that all short messages of the activated user are received, the dual-standby terminal processes the stored services in succession according to a set rule.

In the scheme above, the deferring the processing may be as follows:

during the sending of the short message for the activated user, the dual-standby terminal stores the received voice service and data service of the activated user, and/or the short message service, voice service and data service of the inactivated user; and after determining that all short messages of the activated user are sent, the dual-standby terminal processes the stored services in succession according to a set rule.

In the scheme above, in the case that the dual-standby terminal is in a voice service state, the process that the dual-standby terminal defers the processing on the received voice service and/or data service required by the activated user when processing the short message service may be specifically as follows:

after receiving the short message service of the activated user, the dual-standby terminal receives the short message for the activated user using a current voice service channel and defers the processing on the received data service of the activated user during the receiving process, in the case that the short message service is to receive a short message; or the dual-standby terminal sends the short message for the activated user using the current voice service channel and defers the processing on the received data service of the activated user during the sending process, in the case that the short message service is to send a short message.

In the scheme above, the deferring the processing may be as follows:

during sending or reception of the short message for the activated user, the dual-standby terminal stores the received data service of the activated user and/or the short message service, voice service and data service of the inactivated user; and the dual-standby terminal processes the stored services in succession according to a set rule after determining that all short messages of the activated user are sent.

In the scheme above, in the case that the dual-standby terminal is in a data service state, the process that the dual-standby terminal defers the processing on the received voice service and/or data service required by the activated user, when processing the short message service, may be specifically as follows:

after receiving the short message service of the activated user, the dual-standby terminal receives the short message for the activated user using a current data service channel and defers the processing on the received data service of the activated user during the receiving process, in the case that the short message service is to receive a short message; or the dual-standby terminal sends the short message for the activated user using the current data service channel and defers the processing on the received voice service of the activated user during the sending process, in the case that the short message service is to send a short message.

In the scheme above, the deferring the processing may be as follows:

during the reception or sending the short message for the activated user, the dual-standby terminal stores the received voice service of the activated user and/or the short message service, voice service and data service of the inactivated user; and the dual-standby terminal processes the stored services in succession according to a set rule after determining that all short messages of the activated user are received.

In the scheme above, processing the stored services in succession according to the set rule may be:

processing the stored services according to priorities thereof, and processing the services having the same priority according to stored order thereof.

An apparatus for scheduling short messages in a CDMA single-mode dual-standby terminal is also provided which includes: a processing module and a deferring module, wherein the processing module is configured to process, when a short message service needs to be performed, the short message service of an activated user, and send the received voice service and/or data service required by the activated user as well as the received short message service, voice service and data service required by an inactivated user to the deferring module when processing the short message service; and the deferring module is configured to defer a processing on the services received from the processing module.

In the scheme above, when the dual-standby terminal is in a dual-standby state, the processing module may be specifically configured to: determine a standby user using the short message service according to the received network paging information or a user-originated short message request, activate the standby user using the short message service to enter a short message service processing state, receive a short message for the activated user, and send the received voice service and data service of the activated user as well as the short message service, voice service and data service of the inactivated user to the deferring module during the receiving process; or determine whether or not a single link establishment is allowed and, if a single link establishment is allowed, establish a backward service channel link, send one or more short messages for the activated user, and send the received voice service and data service of the activated user as well as the short message service, voice service and data service of the inactivated user to the deferring module during the sending process; or if a single link establishment is not allowed, establish a backward service channel link, send one short message after the link is successfully established, send the received voice service and data service of the activated user as well as the short message service, voice service and data service of the inactivated user to the deferring module during the sending process, disconnect the backward service channel link after the one short message is sent, determine whether or not the activated user still has short messages to be sent, if so, re-establish a backward service channel link to send a next one short message of the activated user until all rest short messages are sent.

In the scheme above, when the dual-standby terminal is in a voice service state, the processing module may be specifically configured to: in the case where the short message service of a user in a voice service activated state is received, receive the short message for the activated user using a current voice service channel, and send the received data service of the activated user as well as the short message service, voice service and data service of the inactivated user to the deferring module during the receiving process, when the short message service of the user in the voice service activated state is to receive a short message; or send the short message for the activated user using the current voice service channel, and send the received data service of the activated user as well as the short message service, voice service and data service of the inactivated user to the deferring module during the sending process, when the short message service of the user in the voice service activated state is to send a short message.

In the scheme above, when the dual-standby terminal is in a data service state, the processing module may be specifically configured to: in the case where the short message service of a user in a data activated state is received, receive the short message for the activated user using a current data service channel, and send the received voice service of the activated user as well as the short message service, voice service and data service of the inactivated user to the deferring module during the receiving process, when the short message service of the user in the data service activated state is to receive a short message; or send the short message for the activated user using the current data service channel, and send the received voice service of the activated user as well as the short message service, voice service and data service of the inactivated user to the deferring module during the sending process, when the short message service of the user in the data service activated state is to send a short message.

In the scheme above, the processing module may be further configured to trigger the deferring module after completing the processing on the short message service; and the deferring module is specifically configured to: store the services sent from the processing module and process the stored services in succession according to a set rule after receiving triggering information from the processing module.

In accordance with the method and apparatus for scheduling short messages in a CDMA single-mode dual-standby terminal, the CDMA single-mode dual-standby terminal first processes a short message service of an activated user, and then defers a processing on the received voice service and/or data service required by the activated user when processing the short message service and on the received short message service, voice service and data service required by an inactivated user thereby managing and scheduling short message services reasonably.

Moreover, when processing the short message service, the single-mode dual-standby terminal stores the received voice service and/or data service of the activated user as well as the short message service, voice service and data service of an inactivated user, and processes the stored services in order according to a set rule after determining that the short message of the activated user is all received, thus realizing managing and scheduling other services reasonably.

Besides, if the single-mode dual-standby terminal receives voice services of two users before re-establishing a backward service channel link, the single-mode dual-standby terminal processes the received voice services first, and then re-establishes a backward service channel link after completing the voice services, thus guaranteeing priorities of the voice services and therefore providing a satisfied user experience.

DETAILED DESCRIPTION

The basic idea of the present disclosure is that: when a short message service needs to be performed, a CDMA single-mode dual-standby terminal first processes the short message service of a user currently in an activated state and defers a processing on the received voice calling service and/or data service required by the activated user when processing the short message service, and then defers a processing on the received short message service, voice calling service and data service required by a user currently in an inactivated state.

The present disclosure is described below in detail with reference to accompanying drawings in conjunction with specific embodiments.

The method for scheduling short messages in a CDMA single-mode dual-standby terminal is applicable in the following scenarios: a single-mode dual-standby terminal is in a dual-standby state, a single-mode dual-standby terminal is in a voice calling service state, and a single-mode dual-standby terminal is in a data service state. In the following, a CDMA single-mode dual-standby terminal is referred to as a dual-standby terminal for short, a user in an activated state as an activated user for short and a user in a service inactivated state as an inactivated user for short, and two users of a dual-standby terminal are represented by U1 and U2.

Embodiment 1

Figure 1:
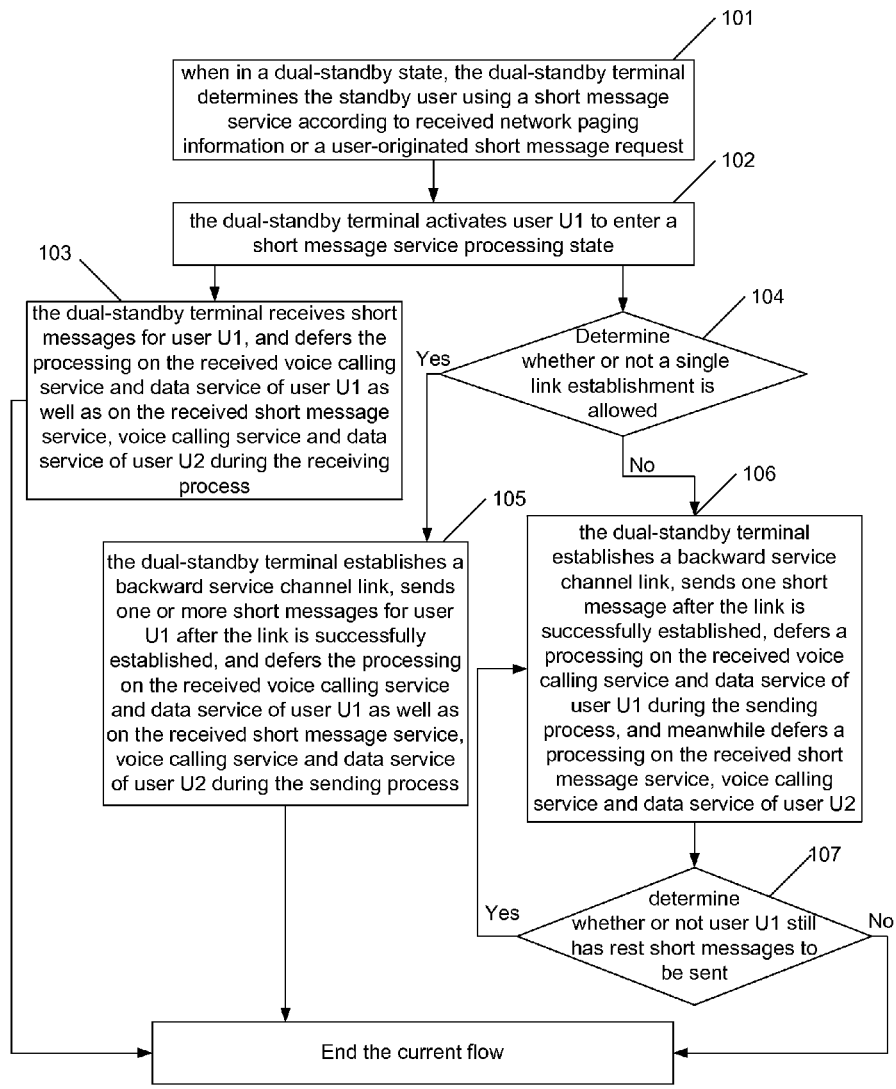
FIG. 1 is a flowchart of a method for scheduling short messages in a CDMA single-mode dual-standby terminal according to embodiment 1 of the present disclosure.

This embodiment is applied in the scenario in which a dual-standby terminal is in a dual-standby state. That is, users U1 and U2 of a dual-standby terminal are currently inactivated. In accordance with this embodiment, the method for scheduling short messages in a dual-standby terminal includes, as shown in FIG. 1, the following steps:

Step 101: when in the dual-standby state, the dual-standby terminal determines the standby user using a short message service according to received network paging information or a user-originated short message request.

Here, the process that the dual-standby terminal determines the standby user using a short message service according to received network paging information is specifically as follows:

the dual-standby terminal determines the standby user according to International Mobile Subscriber Identification Number (IMSI) or Electronic Serial Number (ESN) contained in the general paging message received from a network side, or determines a short message service according to SO=6 or SO=14 in the general paging message; or the dual-standby terminal determines the standby user according to IMSI or ESN contained in the received short message that is directly sent through a paging channel, or determines a short message service according to SO=6 or SO=14 in the short message.

The process that the dual-standby terminal determines the standby user using a short message service according to a user-originated short message request is specifically as follows:

the dual-standby terminal determines the standby user according to IMSI or ESN contained in the user-originated short message request, or determines a short message service according to SO=6 or SO=14 in the user-originated short message request; or the dual-standby terminal determines the standby user according to IMSI or ESN contained in the received short message that is directly sent through an access channel, or determines a short message service according to SO=6 or SO=14 in the short message.

If the dual-standby terminal determines the standby user using a short message service is user U1, then the dual-standby terminal directly discards network paging information of user U2 when it is received thereafter.

Step 102: the dual-standby terminal activates user U1 to enter a short message service processing state, executes Step 103 if the short message service is to receive short messages, or executes Step 104 if the short message service is to send short messages.

Step 103: the dual-standby terminal receives short messages for user U1, defers a processing on the received voice calling service and data service of user U1 as well as on the received short message service, voice calling service and data service of user U2 during the receiving process, and then ends the current flow.

Here, the short message service includes initiating a short message and/or receiving a short message by a user; the voice calling service includes initiating a call and/or receiving voice information by a user; and the data service includes initiating and/or receiving data information by a user.

Receiving a short message is specifically as follows: directly receiving the short message if a paging channel is used; or receiving the short message with a forward service channel, a forward service channel link establishment request is sent to the network side; after receiving the request, the network side establishes a forward service channel link with the dual-standby terminal and returns a message 'LINK ESTABLISHED' to the dual-standby terminal; and the dual-standby terminal then receives a short message after receiving the message.

Here, the paging channel is used to receive a short-content short message, and the forward service channel is used to receive a long-content short message, wherein the length of a short message content is regulated in a CDMA system protocol.

Deferring the processing is specifically as follows: the dual-standby terminal stores the voice calling service and data service of user U1 and/or the short message service, voice calling service and data service of user U2 after receiving the above services of user U1 and user U2 when receiving short messages for user U1.

The dual-standby terminal processes the stored services in order according to a set rule after determining that the short messages of user U1 are all received.

Here, processing the stored services according to a set rule specifically includes: processing the stored services according to the priorities thereof, and then processing the services having the same priority according to the stored order thereof.

Generally, data service, short message service and voice calling service are gradually lowered in priority.

Step 104: the dual-standby terminal determines whether or not a single link establishment is allowed; and then executes Step 105 if a single link establishment is allowed, otherwise executes Step 106.

Here, whether or not a single link establishment is allowed is determined by the setting of the dual-standby terminal: a single link establishment is allowed if the setting of the dual-standby terminal allows to do so, while not allowed if the setting of the dual-standby terminal does not allow to do so.

Here, whether or not a single link establishment is allowed is set by the dual-standby terminal in advance according to the network of an operator.

Step 105: the dual-standby terminal establishes a backward service channel link, sends one or more short messages for user U1 after the link is successfully established, and defers a processing on the received voice calling service and data service of user U1 as well as the received short message service, voice calling service and data service of user U2 during the sending process, and then ends the current flow.

Here, establishing a backward service channel link by the dual-standby terminal is specifically as follows: the dual-standby terminal sends a backward service channel link establishment request to a network side; and after receiving the request, the network side establishes a backward service channel link with the dual-standby terminal and returns a message 'LINK ESTABLISHED' to the dual-standby terminal after the link is established.

If user U1 has a plurality of short messages to send, then the short messages are sent on the backward service channel link in succession until all the short messages are sent.

Deferring the processing is specifically as follows: when sending short messages for user U1, the dual-standby terminal first stores the voice calling service and data service of user U1 and/or the short message service, voice calling service and data service of user U2 after all the above services are received; and then processes the stored services according to a set rule after determining that the short messages of user U1 are all sent.

Here, processing the stored services according to a set rule specifically means: processing the stored services according to processing priorities thereof, and processing the services having the same priority according to stored order thereof.

Generally, the data service, the short message service and the voice calling services are gradually lowered in priority.

Step 106: the dual-standby terminal establishes a backward service channel link, sends one short message after the link is successfully established, defers a processing on the received voice calling service and data service of user U1 during the sending process, and meanwhile defers a processing on the received short message service, voice calling service and data service of user U2.

Step 107: the dual-standby terminal disconnects the backward service channel link after the short messages is sent, determines whether or not user U1 still has short messages to send, re-executes Step 106 if user U1 still has rest short messages to be sent, otherwise ends the current flow.

Here, disconnecting the backward service channel link by the dual-standby terminal is specifically as follows: the dual-standby terminal sends a backward service channel link disconnecting command to the network side; and the network side disconnects the backward service channel link with the dual-standby terminal after receiving the command.

As the voice calling service is superior to the short message service in priority, the dual-standby terminal first processes the voice calling service received from U1 or U2 before re-establishing a backward service channel link, and then re-establishes a backward service channel link after the calling service is completed.

Embodiment 2

Figure 2:
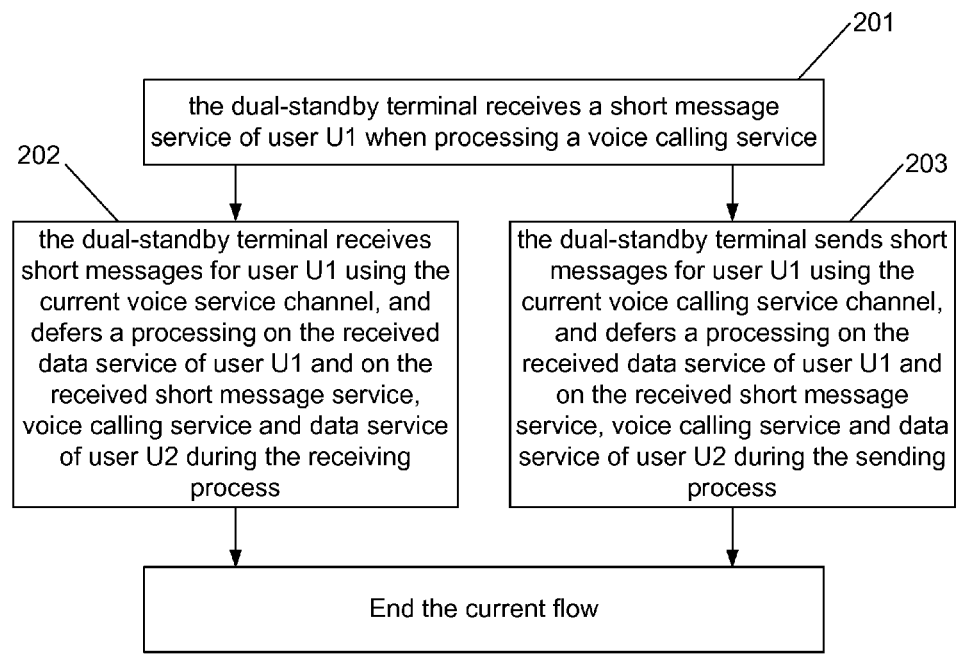
FIG. 2 is a flowchart of a method for scheduling short messages in a CDMA single-mode dual-standby terminal according to embodiment 2 of the present disclosure.

This embodiment is applied in the scenario in which the dual-standby terminal is in a voice calling service state. User U1 is assumed to be in a voice calling service activated state and U2 in a currently inactivated state, and a voice service channel has been established between the dual-standby terminal and a network side. In accordance with this embodiment, as shown in FIG. 2, the method for scheduling short messages in a dual-standby terminal comprises the following steps:

Step 201: the dual-standby terminal receives a short message service of user U1 when processing a voice calling service, executes Step 202 if the received short message service is to receive short messages, otherwise executes Step 203 if the received short message service is to send short messages.

Step 202: the dual-standby terminal receives short messages for user U1 using the current voice service channel, defers a processing on the received data service of user U1 and on the received short message service, voice calling service and data service of user U2 during the receiving process, and then ends the current flow.

Here, deferring the processing is specifically as follows: the dual-standby terminal first stores the data service of user U1 and/or the short message service, voice calling service and data service of user U2 after the above services are received when receiving short messages for user U1; and then processes the stored services according to a set rule after determining that the short messages of user U1 are all received.

Here, processing the stored services according to a set rule specifically means: processing the stored services according to the priorities thereof, and processing the services having the same priority according to the stored order thereof.

Generally, the data service, the short message service and the voice calling services are gradually lowered in priority.

If user U1 still has short messages to receive after the voice calling service is processed, then the dual-standby terminal executes a step identical to Step 103 to receive all rest short messages to be received by user U1.

Step 203: the dual-standby terminal sends short messages for user U1 using the current voice calling service channel, defers a processing on the received data service of user U1 and defers a processing on the received short message service, voice calling service and data service of user U2 during the sending process, and then ends the current flow.

Here, deferring the processing is specifically as follows: the dual-standby terminal first stores the data service of user U1 and/or the short message service, voice calling service and data service of user U2 after receiving the above services when sending short messages for user U1; and then processes the stored services according to a set rule after determining that the short messages of user U1 are all sent.

Here, processing the stored services according to a set rule specifically means: processing the stored services according to the priorities thereof, and processing the services having the same priority according to the stored order thereof.

Generally, the data service, the short message service and the voice calling services are gradually lowered in priority.

If user U1 has a plurality of short messages to send, then the current voice service channel is used to send the short messages in succession.

If user U1 still has short messages to send after the voice calling service is processed, then the dual-standby terminal continues to execute Steps 104-107 to send all the rest short messages to be sent by user U1.

Embodiment 3

Figure 3:
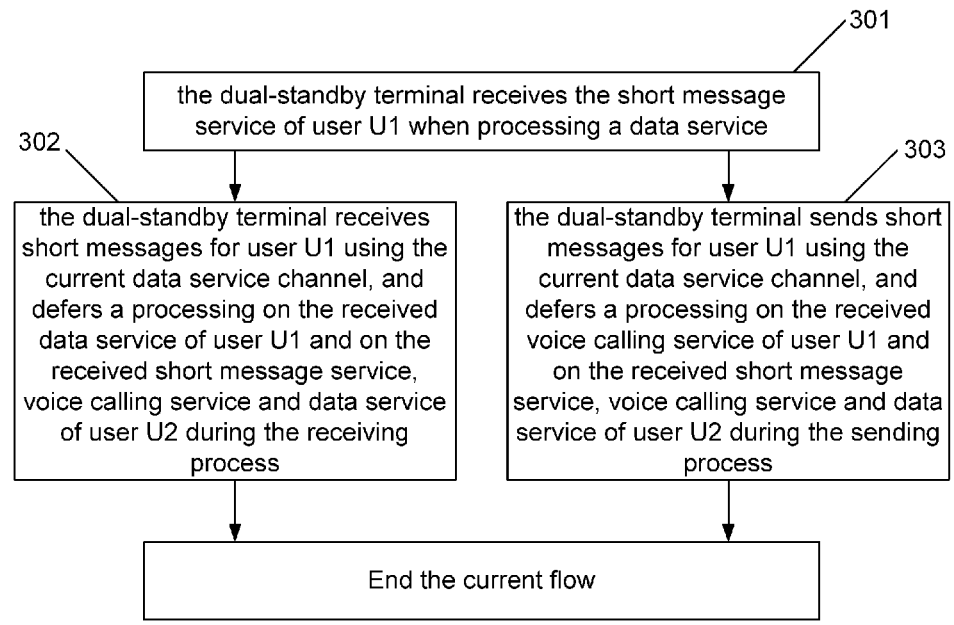
FIG. 3 is a flowchart of a method for scheduling short messages in a CDMA single-mode dual-standby terminal according to embodiment 3 of the present disclosure.

This embodiment is applied in the scenario in which the dual-standby terminal is in a data service state. User U1 is assumed to be in a data activated state and U2 in a currently inactivated state, and a data service channel has been established between the dual-standby terminal and a network side. In accordance with this embodiment, as shown in FIG. 3, the method for scheduling short messages in a dual-standby terminal comprises the following steps:

Step 301: the dual-standby terminal receives the short message service of user U1 when processing a data service, executes Step 302 if the received short message service is to receive short messages, otherwise executes Step 303 if the received short message service is to send short messages.

Here, if the dual-standby terminal receives the voice calling service of the U1 prior to the short message service of the U1 when processing the data service, then the dual-standby terminal processes the voice calling service of the U1 prior to the short message service of the U1, which is the same way used in Steps 201-203.

Step 302: the dual-standby terminal receives short messages for user U1 using the current data service channel, defers a processing on the received data service of user U1 and defers a processing on the received short message service, voice calling service and data service of user U2 during the receiving process, and then ends the current flow.

Here, deferring the processing is specifically as follows: when receiving short messages for user U1, the dual-standby terminal first stores the voice calling service of user U1 and/or the short message service, voice calling service and data service of user U2 after receiving all the above services; and then processes the stored services according to a set rule after determining that the short messages of user U1 are all received.

Here, processing the stored services according to a set rule specifically means: processing the stored services according to the priorities thereof, and processing the services having the same priority according to the stored order thereof.

Generally, the data service, the short message service and the voice calling services are gradually lowered in priority.

If user U1 still has short messages to receive after the data service is processed, then the dual-standby terminal executes a step identical to Step 103 to receive all the rest short messages to be received by user U1.

Step 303: the dual-standby terminal sends short messages for user U1 using the current data service channel, defers a processing on the received voice calling service of user U1 and defers a processing on the received short message service, voice calling service and data service of user U2 during the sending process, and then ends the current flow.

Here, deferring the processing is specifically as follows: when sending short messages for user U1, the dual-standby terminal first stores the voice calling service of user U1 and/or the short message service, voice calling service and data service of user U2 after receiving all the above services; and then processes the stored services according to a set rule after determining that the short messages of user U1 are all sent.

Here, processing the stored services according to a set rule specifically means: processing the stored services according to the priorities thereof, and processing the services having the same priority according to the stored order thereof.

Generally, the data service, the short message service and the voice calling services are gradually lowered in priority.

If user U1 has a plurality of short messages to send, then the current data service channel is used to send the short messages in succession.

If user U1 still has short messages to send after the data service is processed, then the dual-standby terminal continues to execute Steps 104-107 to send all the rest short messages to be sent by user U1.

Figure 4:
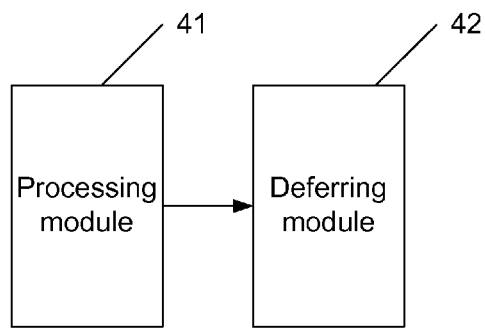
FIG. 4 is a schematic diagram showing a structure of an apparatus for scheduling short messages in a CDMA single-mode dual-standby terminal of the present disclosure.

In order to carry out the above methods, the present disclosure also provides an apparatus for scheduling short messages in a CDMA single-mode dual-standby terminal. As shown in FIG. 4, the apparatus comprises a processing module 41 and a deferring module 42.

The processing module 41 is configured to process, when a short message service needs to be performed, the short message service of a user currently in an activated state, and send the received voice calling service and/or data service required by the user in the activated state as well as the received short message service, voice calling service and data service required by another user currently in an inactivated state to the deferring module 42 when processing the short message service.

The deferring module 42 is configured to defer a processing on all the services received from the processing module 41.

Specifically, when the dual-standby terminal is in a dual-standby state, the processing module 41 is specifically configured to: determine a standby user using a short message service according to the received network paging information or the user-originated short message request, activate the standby user using the short message service to enter a short message service processing state to receive short messages for the activated user, and send the received voice calling service and data service of the activated user as well as the short message service, voice calling service and data service of the currently inactivated user to the deferring module 42 during the receiving process; or determine whether or not a single link establishment is allowed and; if a single link establishment is allowed, establish a backward service channel link and then send one or more short messages for the activated user after the link is established, and send the received voice calling service and data service of the activated user as well as the short message service, voice calling service and data service of the currently inactivated user to the deferring module 42 during the sending process; or if a single link establishment is not allowed, establish a backward service channel link and then send one short message after the link is successfully established, send the received voice calling service and data service of the activated user as well as the short message service, voice calling service and data service of the currently inactivated user to the deferring module 42 during the sending process, disconnect the backward service channel link after the one short message is sent, and determine whether or not the activated user still has other short messages to be sent, if so, re-establish a backward service channel link to send a next one short message until all rest short messages are sent from the activated user.

The processing module 41 is further configured to process a received voice calling service of one user of the two users before re-establishing the backward channel link.

When the dual-standby terminal is in a voice calling state, the processing module 41 is specifically configured to: during the voice calling service processing of the activated user, a short message service of the user is received;

if the short message service is to receive a short message, the processing module 41 receives the short message for the activated user using the current voice service channel, and sends the received data service of the activated user as well as the short message service, voice service and data service of the currently inactivated user to the deferring module 42 during the receiving process; or if the short message service is to send a short message, the processing module 41 sends the short message for the activated user using the current voice service channel, and sends the received data service of the activated user as well as the short message service, voice calling service and data service of the currently inactivated user to the deferring module 42 during the sending process.

When the dual-standby terminal is in a data service state, the processing module 41 is specifically configured to: during the data service processing of the activated user, a short message service of the user is received;

if the short message service is to receive a short message, the processing module 41 receives the short message for the activated user using the current data service channel, and sends the received voice calling service of the activated user as well as the short message service, voice service and data service of the currently inactivated user to the deferring module 42 during the receiving process; or if the short message service is to send a short message, the processing module 41 sends the short message for the activated user using the current data service channel, and sends the received voice calling service of the activated user as well as the short message service, voice calling service and data service of the currently inactivated user to the deferring module 42 during the sending process.

The processing module 41 is further configured to trigger the deferring module 42 after the short message service is completed.

The deferring module 42 is specifically configured to: store the services sent from the processing module 41 and then process the stored services in order according to a set rule after receiving triggering information from the processing module 41.

The mentioned above is only preferred embodiments of the disclosure but not limitation for the protection scope of the disclosure, various modification and variations can be devised by those skilled in this art, and it should be understood that all the modifications, equivalents and improvements devised without departing from the spirit and scope of the disclosure belong to the protection scope of the disclosure.

What is claimed is:

1. A method for short message service (SMS) scheduling within a Code Division Multiplex Access (CDMA) single-mode dual-standby terminal, comprising:

when a short message service needs to be performed, processing, by the CDMA single-mode dual-standby terminal, a short message service under an activated user number while deferring processing a received voice service and/or data service to be performed under the activated user number as well as a received short message service, voice service and data service to be performed under an inactivated user number, such that concurrent SMS and other services are scheduled, wherein two user numbers based on a single base band and a single radio frequency module is implemented in the CDMA single-mode dual-standby terminal; the short message service comprises short message initiating and/or receiving, wherein when processing the short message service, the deferring processing the received service comprises: when processing the short message service, storing, by the dual-standby terminal, the received service; and after completing processing the short message service, processing, by the dual-standby terminal, stored services in succession according to a set rule, wherein the processing the stored services in succession according to the set rule comprises:

processing the stored services according to priorities thereof, and processing the services having the same priority according to an order in the storing, wherein stored data service, short message service and voice service are processed in descending priorities.

2. The method according to claim 1, further comprising, before the short message service needs to be performed:
determining, by the dual-standby terminal, a standby user number using the short message service according to received network paging information or a user-originated short message request;
activating, by the dual-standby terminal, the standby user number using the short message service to enter a short message service processing state;
in the case that the short message service is to receive a short message, when processing the short message service, the deferring processing the received voice service and/or data service to be performed under the activated user number is as follows:
receiving, by the dual-standby terminal, the short message for the activated user number and deferring, by the dual-standby terminal, processing the received voice service and data service of the activated user number.

3. The method according to claim 2, wherein in the case that the short message service is to send a short message, when processing the short message service, the deferring processing the received voice service and/or data service to be performed under the activated user number is as follows:
determining, by the dual-standby terminal, whether or not a single link establishment is allowed;
establishing, by the dual-standby terminal, when the single link establishment is allowed, a backward service channel link, sending a short message for the activated user number, and deferring processing the received voice service and data service of the activated user number during the sending process; or
establishing, by the dual-standby terminal, when the single link establishment is not allowed, a backward service channel link, sending one short message, and deferring processing the received voice service and data service of the activated user number during the sending process; disconnecting, by the dual-standby terminal, the backward service channel link after the one short message is sent; determining whether another short message is to be sent using the activated user number, if so, re-establishing a backward service channel link to send a next one short message until all rest short messages are sent.

4. The method according to claim 2, wherein receiving the short message is as follows:
directly receiving the short message when a paging channel is used to receive the short message; or
sending, by the dual-standby terminal, when a forward service channel is used to receive the short message, a forward service channel link establishment request to a network side; after receiving the request, establishing, by the network side, a forward service channel link with the dual-standby terminal and returning a message 'LINK ESTABLISHED' to the dual-standby terminal; and receiving, by the dual-standby terminal, the short message after receiving the returned message.

5. The method according to claim 2, wherein the deferring processing is as follows:
storing, by the dual-standby terminal, during the reception of the short message for the activated user number, the received voice service and data service of the activated user number, and/or the short message service, voice service and data service of the inactivated user number; and
processing, by the dual-standby terminal, after determining that all short messages of the activated user number are received, the stored services in succession according to a set rule.

6. The method according to claim 3, wherein the deferring processing is as follows:
storing, by the dual-standby terminal, during the sending of the short message for the activated user number, the received voice service and data service of the activated user number, and/or the short message service, voice service and data service of the inactivated user number; and
processing, by the dual-standby terminal, after determining that all short messages of the activated user number are sent, the stored services in succession according to a set rule.

7. The method according to claim 1, wherein in the case that the dual-standby terminal is in a voice service state, when processing the short message service, the deferring processing the received voice service and/or data service to be performed under the activated user number is as follows:
after receiving the short message service of the activated user number,
in the case that the short message service is to receive a short message, receiving, by the dual-standby terminal, the short message for the activated user number using a current voice service channel and deferring, by the dual-standby terminal, processing the received data service of the activated user number during the receiving process; or
in the case that the short message service is to send a short message, sending, by the dual-standby terminal, the short message for the activated user number using the current voice service channel and deferring, by the dual-standby terminal, processing the received data service of the activated user number during the sending process.

8. The method according to claim 7, wherein the deferring processing is as follows:
storing, by the dual-standby terminal, during the sending or reception of the short message for the activated user number, the received data service of the activated user number and/or the short message service, voice service and data service of the inactivated user number; and
processing, by the dual-standby terminal, the stored services in succession according to a set rule after determining that all short messages of the activated user number are sent.

9. The method according to claim 1, wherein in the case that the dual-standby terminal is in a data service state, when processing the short message service, the deferring processing the received voice service and/or data service to be performed under the activated user number is as follows:
after receiving the short message service of the activated user number,
in the case that the short message service is to receive a short message, receiving, by the dual-standby terminal, the short message for the activated user number using a current data service channel and deferring, by the dual-standby terminal, processing the received data service of the activated user number during the receiving process; or
in the case that the short message service is to send a short message, sending, by the dual-standby terminal, the short message for the activated user number using the current data service channel and deferring, by the dual-standby terminal, processing the received voice service of the activated user number during the sending process.

10. The method according to claim 9, wherein the deferring processing is as follows:
- storing, by the dual-standby terminal, during the reception or sending of the short message for the activated user number, the received voice service of the activated user number and/or the short message service, voice service and data service of the inactivated user number; and
- processing, by the dual-standby terminal, the stored services in succession according to a set rule after determining that all short messages of the activated user number are received.

11. The method according to claim 3, wherein receiving the short message is as follows:
- directly receiving the short message when a paging channel is used to receive the short message; or
- sending, by the dual-standby terminal, when a forward service channel is used to receive the short message, a forward service channel link establishment request to a network side; after receiving the request, establishing, by the network side, a forward service channel link with the dual-standby terminal and returning a message 'LINK ESTABLISHED' to the dual-standby terminal; and receiving, by the dual-standby terminal, the short message after receiving the returned message.

* * * * *